United States Patent [19]
Goller et al.

[11] Patent Number: 5,994,889
[45] Date of Patent: Nov. 30, 1999

[54] CIRCUIT ARRANGEMENT FOR LIMITING THE CURRENT AT MAKE OF A CAPACITATIVE LOAD

[75] Inventors: Hugo Goller, Munich; Klaus Hoffmann, Bad Toelz Ellbach, both of Germany

[73] Assignee: Siemens Aktiengesellschaft, Munich, Germany

[21] Appl. No.: 09/203,046

[22] Filed: Dec. 2, 1998

[30] Foreign Application Priority Data

Jul. 24, 1998 [DE] Germany .................. 198 33 452

[51] Int. Cl.⁶ ........................................ H03H 1/00
[52] U.S. Cl. ..................... 323/370; 323/901; 363/49
[58] Field of Search .................... 323/370, 901; 363/49, 54

[56] References Cited

U.S. PATENT DOCUMENTS 4,668,903  5/1987  Elbert ........................ 323/369

Primary Examiner—Shawn Riley
Attorney, Agent, or Firm—Hill & Simpson

[57] ABSTRACT

A circuit arrangement for limiting the current at make which includes hot-carrier thermistors that see to a reduction of the current flow at make. Only when a further hot-carrier thermistor has been adequately heated by the flow of current are the hot-carrier thermistors bridged, and the capacitative load receives the full operating voltage. After turn-off, an ambient temperature-compensated voltage divider at the base of a transistor prevents the immediate re-activation until the further hot-carrier thermistor and, thus, all hot-carrier thermistors, have adequately cooled.

3 Claims, 1 Drawing Sheet

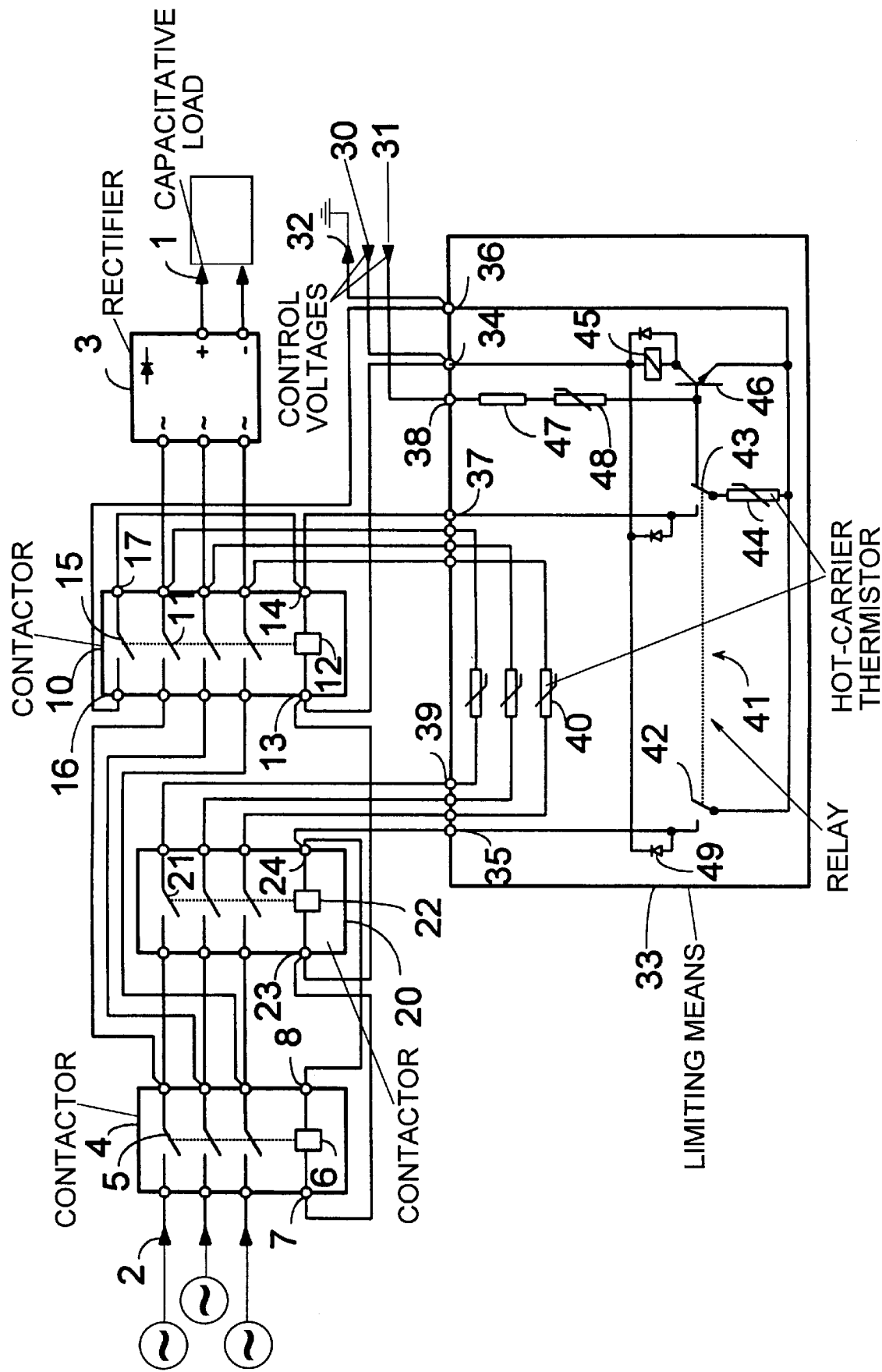

CIRCUIT ARRANGEMENT FOR LIMITING THE CURRENT AT MAKE OF A CAPACITATIVE LOAD

BACKGROUND OF THE INVENTION

1. Field of the Invention

The present invention is directed to a circuit arrangement for limiting the current at make of a capacitative load that is operated with an operating voltage.

2. Description of the Prior Art

When switching on a capacitative load such as, for example, servo output stages for driving X-Y motors, the capacitative load charges suddenly. Given support capacitors (up to 18000 $\mu$F) of the output stages, current peaks up to 200 A can occur that fuse the contacts of contactors that intervene in the circuit for safety reasons. These contactors are, thus, no longer functional.

An object of the present invention, therefore, is to specify a circuit arrangement for limiting the current at make of a capacitative load that reduces the currents flowing during the turn-on event.

SUMMARY OF THE INVENTION

Such object is achieved in accordance with the teachings of the present invention wherein two switches that switch at different points in time are advantageously employed. The first switch switches the current via a hot-carrier thermistor that is connected between operating voltage and capacitative load. As a result, the current at make is limited and increases in its time curve by intrinsic heating of the hot-carrier thermistor. The second switch switches after a delay time relative to the first switch and, thus, effects that the hot-carrier thermistor is bridged at the operating voltage and is available to the capacitative load.

In an embodiment of the present invention, an especially simple circuit arrangement is employed by the further hot-carrier thermistor that effects the delay time.

In another embodiment of the present invention, in order to avoid a current surge during turn-on after the hot-carrier thermistors are still heated, it is provided that the first and the second switch are formed as a relay, switching in common, whose supply voltage is only switched where the further hot-carrier thermistor and, thus, the other hot-carrier thermistor have already cooled.

Additional features and advantages of the present invention are described in, and will be apparent from, the Detailed Description of the Preferred Embodiments and the Drawings.

DESCRIPTION OF THE DRAWINGS

FIG. 1 shows a circuit arrangement for limiting the current at make of a capacitative load.

DETAILED DESCRIPTION OF THE PREFERRED EMBODIMENTS

According to FIG. 1, a capacitative load 1 is connected to an operating voltage 2 via a rectifier 3 as well as a circuit of contactors 4, 10, 20. The inputs of the first contactor 4 are thereby connected to the operating voltage 2. Given a three-phase supply, it is a matter of three inputs for which the respectively same current paths apply. One current path is described; the other two current paths are correspondingly circuited. The first contactor 4 is equipped with switches 5 that are switched by an activator means 6 when an activation voltage is adjacent at the activator input 7 and at the activator output 8. The inputs of the first contactor 4 are connected to the outputs of the first contactor 4 via the switches 5. The outputs of contactor 4 are connected to some of the inputs of a second contactor 10 that is equipped with switches 11 and a further switch 15. The switches 11 and the further switch 15 are switched by an activator means 12 of the second contactor 10 when an activation voltage is adjacent at both the activator input 13 and the activator output 14 of the second contactor 10. The outputs of the second contactor 10 are connected to the inputs of the rectifier 3 that rectifies the adjacent three-phase current voltage and applies it to the capacitative load 1; for example, the servo output stage of X-Y motors.

A series circuit of a third contactor 20 and hot-carrier thermistors 40 is connected between the output of the first contactor 4 and the rectifier 3 and parallel to the second contactor 10. The hot-carrier thermistor 40 exhibits a temperature-dependent impedance behavior wherein the impedance decreases with increasing temperature (NTC: negative temperature coefficient). To that end, the outputs of the first contactor 4 are connected to the inputs of the third contactor 20, and the inputs of the third contactor 20 are connected via switches 21 to the outputs of the third contactor 20. The switches 21 are switched by an activator means 22 in the third contactor 20 when an activation voltage is adjacent at the activator input 23 and at the activator output 24.

The hot-carrier thermistors 40 are arranged in a limiting means 33 for current at make and are connected via terminals 39 to the output of the third contactor 20 and to the outputs of the second contactor 10.

Two control voltages 30, 31 that, for example, both amount to 24 V DC voltage compared to the ground 32, serve for the control of the contactors 4, 10, 20. The terminal of the first control voltage 30 is connected to the activator inputs 7, 13, 23 of the first 4, second 10 and third 20 contactors, respectively, as well as to a first terminal 34 of the limiting means 33 for current at make. The activator outputs 8, 24 of the first 4 and third 20 contactors, respectively, are connected to a second terminal 35 of the limiting means 33 for the current at make. The second terminal 35 of the limiting means 33 for the current at make is applied, via a first switch 42 of a relay 41, to a third terminal 36 of the limiting means 33 for the current at make that is connected to the ground line 32.

The activator output 14 of the second contactor 10 lies at a fourth terminal 37 of the limiting means 33 for the current at make. This fourth terminal 37 is connected via a second switch 43 of the relay 41 and via a further hot-carrier thermistor 44 connected in series therewith to the third terminal 36 of the limiting means 33 for the current at make.

The activator output 14 of the second contactor 10, over and above this, is connected to a further output 17 of the second contactor 10, wherein the further output 17 is connected via the further switch 15 to a further input 16 of the second contactor 10, and then the latter is connected to the ground 32.

The terminal of the second control voltage 31 is connected to a fifth terminal 38 of the limiting means for the current at make, this being connected via a resistor 47 and an additional hot-carrier thermistor 48 to the base of an npn-transistor 46. The emitter of the npn-transistor 45 is applied via the third terminal 36 to the ground 32, whereas the collector of the transistor 46 is adjacent the first terminal 34 of the limiting means 33 for the current at make via a fuse 45. The second terminal 35, the fourth terminal 37 and the collector of the transistor 46 are respectively connected to the first terminal 34 via clinching diodes 49.

The function of the circuit arrangement is as follows: the first control voltage 30 serves as supply voltage of the relay 41 and the second control voltage 31 serves as control voltage of the relay 41. When either one of the voltages 30, 31 is missing, the relay 41 is not excited and the capacitative load 1 is not connected to the operating voltage 2. When the relay 41 switches, the first contactor 4 and the third contactor 20 also switch simultaneously. Limited by the hot-carrier thermistors 40, current can flow via the rectifier 3 into the load circuit 1. This limited current at make increases in its time curve due to the intrinsic heating of the hot-carrier thermistors 40 The charging of the capacitative load 1 thus occurs in an avalanche-like manner. The charging current, in turn, decreases with increasing charging. Since operating current already flows with the cut-in, a certain voltage drops off at the hot-carrier thermistors 40. The voltage drop-off is all the lower the lower the impedance of the hot-carrier thermistors 40. When the second contactor 10 bridges the hot-carrier thermistors 40, the current peak caused by the residual charging of the capacitative load 1 is kept within harmless limits.

Simultaneously with the activator circuits of the first contactor 4 and the third contactor 20, the relay 41 also closes the activator circuit of the second contactor 10. The current flow through this circuit heats the further hot-carrier thermistor 44. The further hot-carrier thermistor 44 becomes lower in impedance, the voltage drop-off at the further hot-carrier thermistor 44 sinks and the activator voltage increases. When the switching threshold of the second contactor 10 is exceeded, the second contactor 10 bridges the hot-carrier thermistor 40. The electrical energy is thus available to the capacitative load 1 without limitation.

The self-holding circuit via the further switch 15 holds the second contactor 10 in the activated condition. All hot-carrier thermistors 40, 44 now cool uniformly, so that a re-activation with delay is possible after the turn-off of the first 4, second 10 and third 20 contactors. When, however, the cooling time is too short, so that the current surge at make could become too high given reactivation, the ambient temperature-compensated base voltage divider at the npn-transistor 46 prevents the switching of the relay 41 via the additional hot-carrier thermistor 48 until the threshold of the base voltage is exceeded as a result of the cooling of the further hot-carrier thermistor 44. Only then does the relay 41 switch, the first contactor 4 and the third contactor 20 switch and, after a delay, the second contactor 10.

Although the present invention has been described with reference to specific embodiments, those of skill in the art will recognize that changes may be made thereto without departing from the spirit and scope of the invention as set forth in the hereafter appended claims.

We claim as our invention:

1. A circuit arrangement for limiting the current at make of a capacitative load that is operated with an operating voltage, comprising:

a first contactor having operating inputs to which the operating voltage is applied;

a second contactor having operating inputs which are at least partially connected to the operating outputs of the first contactor, and having operating outputs connected to the capacitative load;

a third contactor having operating inputs connected to the operating outputs of the first contactor;

a plurality of hot-carrier thermistors respectively circuited between the operating outputs of the third contactor and the capacitative load;

a first switch that closes the first and the third contactors; and a second switch that closes the second contactor after a delay time relative to the closing of the first and the third contactors.

2. A circuit arrangement as claimed in claim 1, further comprising:

a further hot-carrier thermistor arranged in a supply circuit of the second contactor, wherein the delay time is generated by the heating at the further hot-carrier thermistor.

3. A circuit arrangement as claimed in claim 2, further comprising:

a relay formed from the first switch and the second switch switching in common; and a transistor having an ambient temperature-compensated voltage divider, wherein the relay draws supply voltage from the voltage divider so that the relay is only switched when the further hot-carrier thermistor has cooled.

* * * * *